United States Patent
Choi et al.

(10) Patent No.: US 7,983,215 B2
(45) Date of Patent: Jul. 19, 2011

(54) COMMUNICATION DEVICE, METHOD FOR TRANSMITTING AN UPLINK TRANSMISSION CONTROL MESSAGE, METHOD FOR RECEIVING AN UPLINK TRANSMISSION CONTROL MESSAGE

(75) Inventors: Hyung-Nam Choi, Hamburg (DE); Herbert Dawid, Aachen (DE)

(73) Assignee: Infineon Technologies AG, Neubiberg (DE)

( * ) Notice: Subject to any disclaimer, the term of this patent is extended or adjusted under 35 U.S.C. 154(b) by 721 days.

(21) Appl. No.: 12/104,931

(22) Filed: Apr. 17, 2008

(65) Prior Publication Data

US 2009/0262680 A1 Oct. 22, 2009

(51) Int. Cl.
*H04Q 7/20* (2006.01)
*H04L 12/28* (2006.01)
*H04J 1/00* (2006.01)

(52) U.S. Cl. ..... 370/329; 370/328; 370/349; 370/395.4; 370/469; 455/450

(58) Field of Classification Search .......... 370/218–230, 370/328, 329, 395.4, 363–479, 522; 455/450
See application file for complete search history.

(56) References Cited

U.S. PATENT DOCUMENTS

| 6,738,638 | B1 | 5/2004 | Moulsley | |
|---|---|---|---|---|
| 7,519,032 | B2 * | 4/2009 | Soomro et al. | 370/338 |
| 7,889,755 | B2 * | 2/2011 | Malladi et al. | 370/432 |
| 2002/0141331 | A1 * | 10/2002 | Mate et al. | 370/218 |
| 2007/0161377 | A1 * | 7/2007 | Kodikara Patabandi et al. | 455/450 |
| 2007/0286080 | A1 | 12/2007 | Kim et al. | |
| 2008/0043771 | A1 | 2/2008 | Cho et al. | |

FOREIGN PATENT DOCUMENTS

| EP | 1 009 184 B1 | 6/2000 |
|---|---|---|
| EP | 1 080 597 B1 | 9/2005 |
| EP | 1 841 249 A1 | 10/2007 |
| EP | 1 672 941 B1 | 11/2007 |
| WO | WO-2005/094189 A2 | 10/2005 |
| WO | WO-2008/002229 A1 | 1/2008 |

OTHER PUBLICATIONS

Erik Dahlman et al. 3G Evolution : HSPA and LTE for Mobile Broadband (Jan. 1, 2007), pp. 264-485.*
Tdoc RP-070677; "Enhanced Uplink for CELL_FACH State in FDD"; Nokia Siemens Networks, Nokia, Ericsson, Qualcomm, T-Mobile, Telecom Italia; TSG-RAN #37 Meeting, Riga, Latvia, Sep. 11-14, 2007.

(Continued)

*Primary Examiner* — Afsar M. Qureshi
(74) *Attorney, Agent, or Firm* — Dickstein Shapiro LLP

(57) ABSTRACT

In an embodiment, a communication device is provided. The communication device may include a scheduling message generating circuit configured to generate a scheduling message such that the scheduling message includes a receiving scheduling information specifying when to receive an uplink transmission control message, the receiving scheduling information being defined depending on a configuration of an uplink transmission channel, an uplink transmission control message generating circuit configured to generate an uplink transmission control message to control an uplink transmission from another communication device via the uplink transmission channel, and a transmitter circuit configured to transmit the uplink transmission control message in accordance with the receiving scheduling information such that the uplink transmission control message is transmitted via an uplink transmission control downlink channel.

25 Claims, 9 Drawing Sheets

OTHER PUBLICATIONS

3GPP TS 25.211 V7.4.0 (Nov. 2007); Technical Specification; 3rd Generation Partnership Project; Technical Specification Group Radio Access Network; Physical channels and mapping of transport channels onto physical channels (FDD) (Release 7).

3GPP TS 25.214 V7.7.0 (Nov. 2007); Technical Specification; 3rd Generation Partnership Project; Technical Specification Group Radio Access Network; Physical layer procedures (FDD) (Release 7).

Tdoc R1-074300; "Enchanted CELL_FACH State with E-DCH"; Nokia, Nokia Siemens Networks; 3GPP TSG-RAN WG2 Meeting #59bis, Shanghai, China, Oct. 8-12, 2007.

3GPP TS 25.331 V4.5.0 (Jun. 2002); Technical Specification; 3rd Generation Partnership Project; Technical Specification Group Radio Access Network; Radio Resource Control (RRC); Protocol Specification (Release 4).

Nokia: "Requirement scenario for discontinuous UL DPCCH transmission operation"; 3GPP TSG-RAN WG4 Meeting #42, #R4-070134, Kobe, Japan, May 2007.

Dahlman, Erik et al.; "3G Evolution: HSPA and LTE for Mobile Broadband"; Jan. 1, 2007, No. 1, XP040425740.

International Search Report issued for corresponding PCT/EP2009/053760, dated Aug. 3, 2009.

3GPP TS 25.214 V8.1.0 (Mar. 2008); Technical Specification; 3rd Generation Partnership Project; Technical Specification Group Radio Access Network; Physical layer procedures (FDD) (Release 8).

* cited by examiner

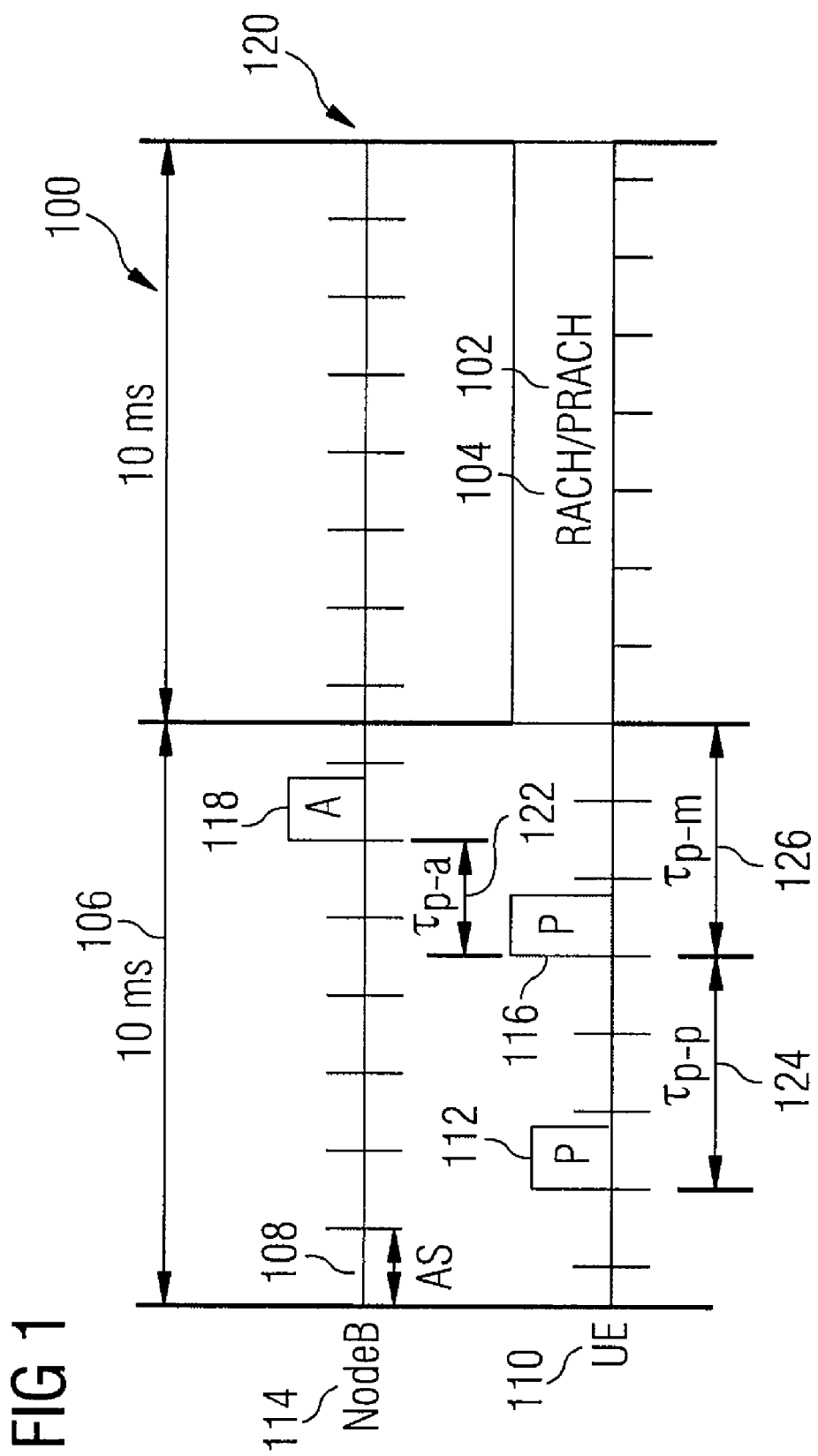

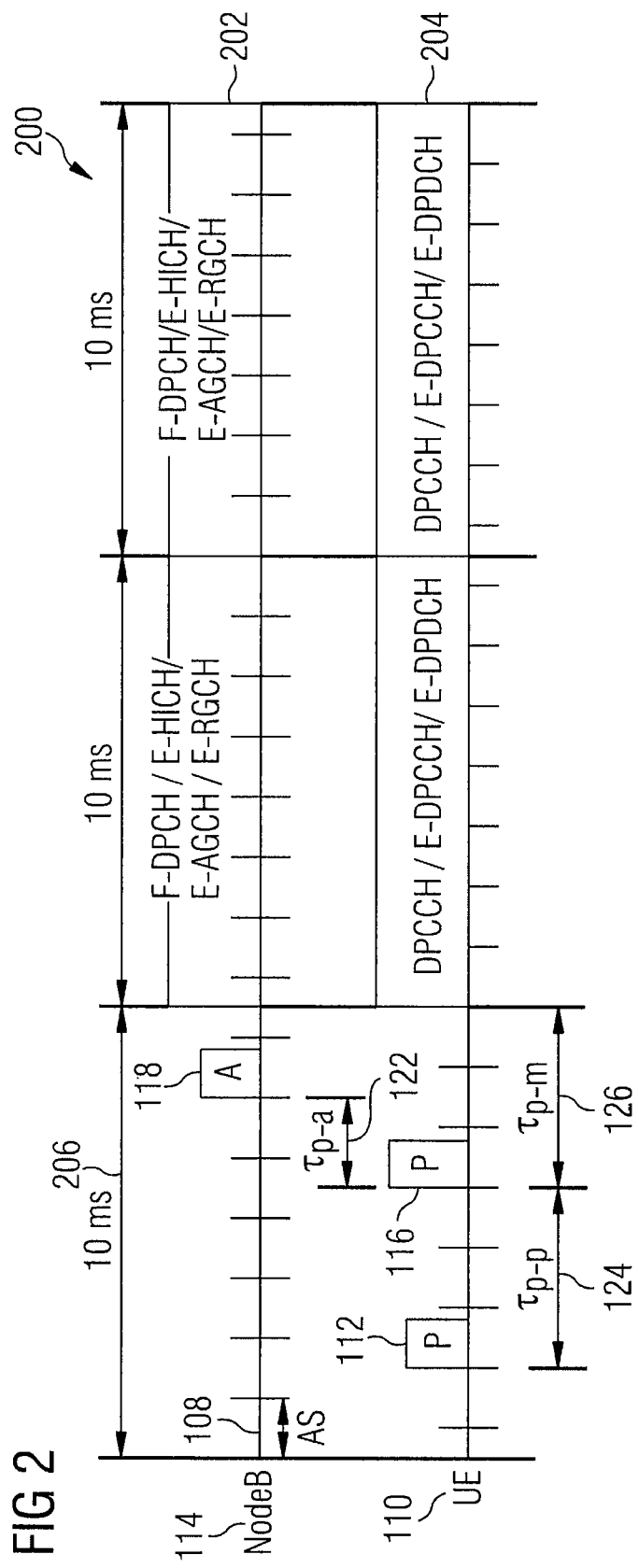

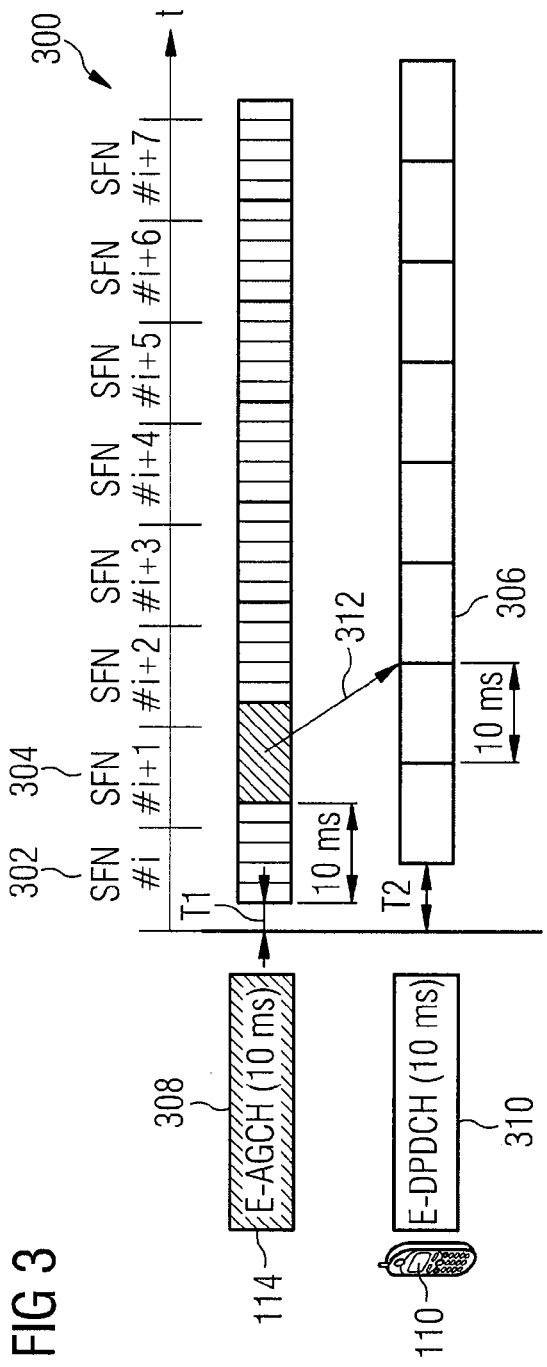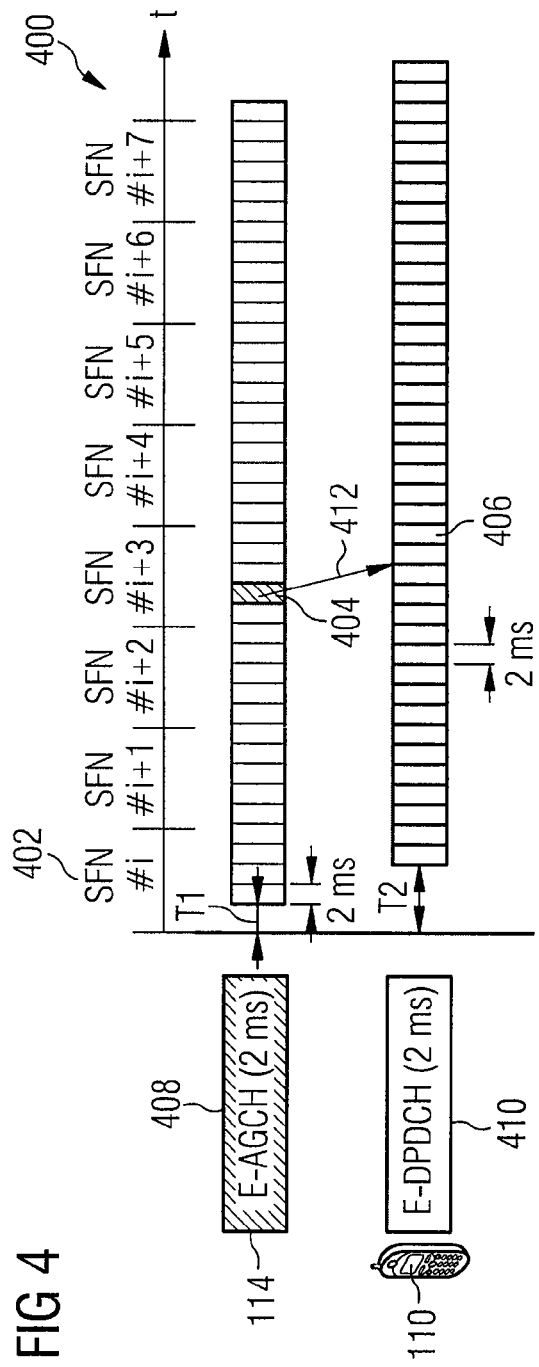

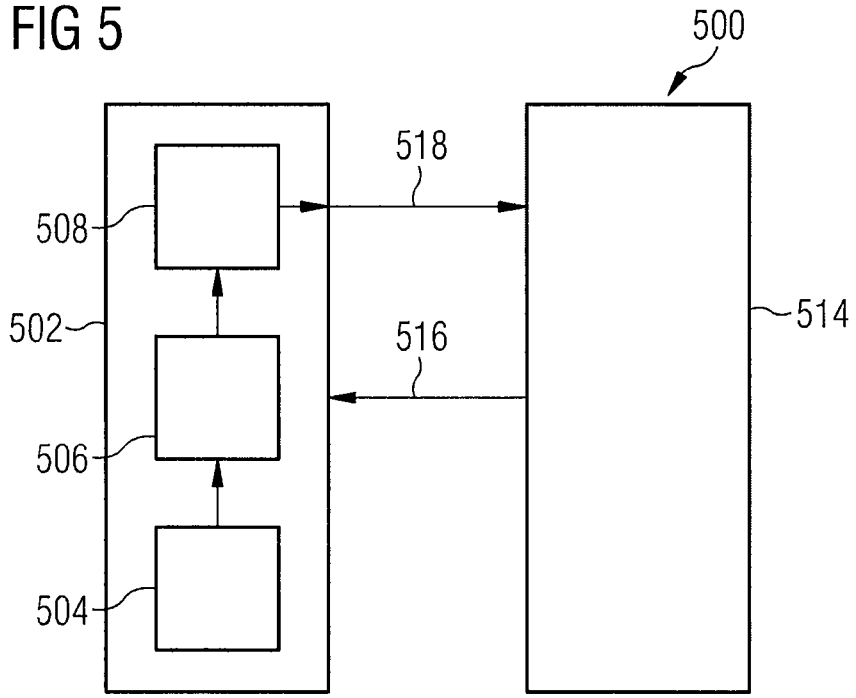
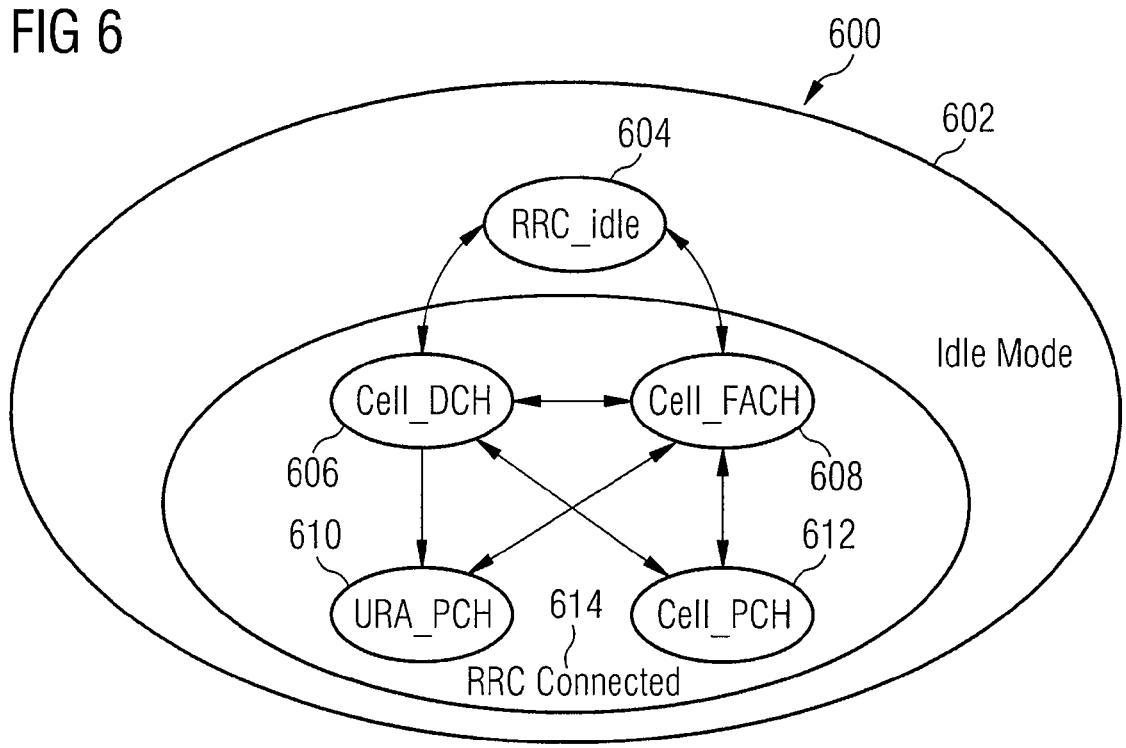

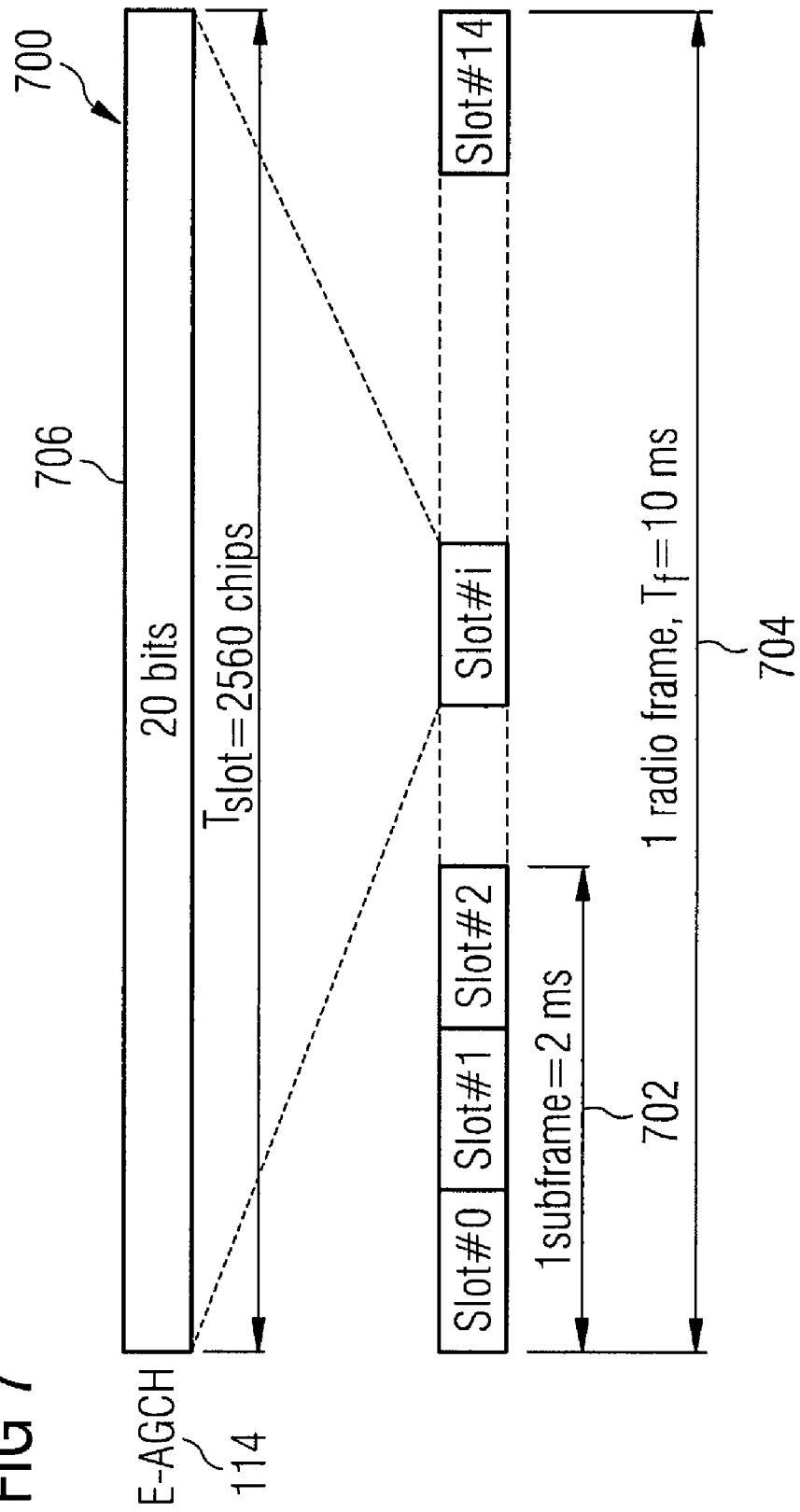

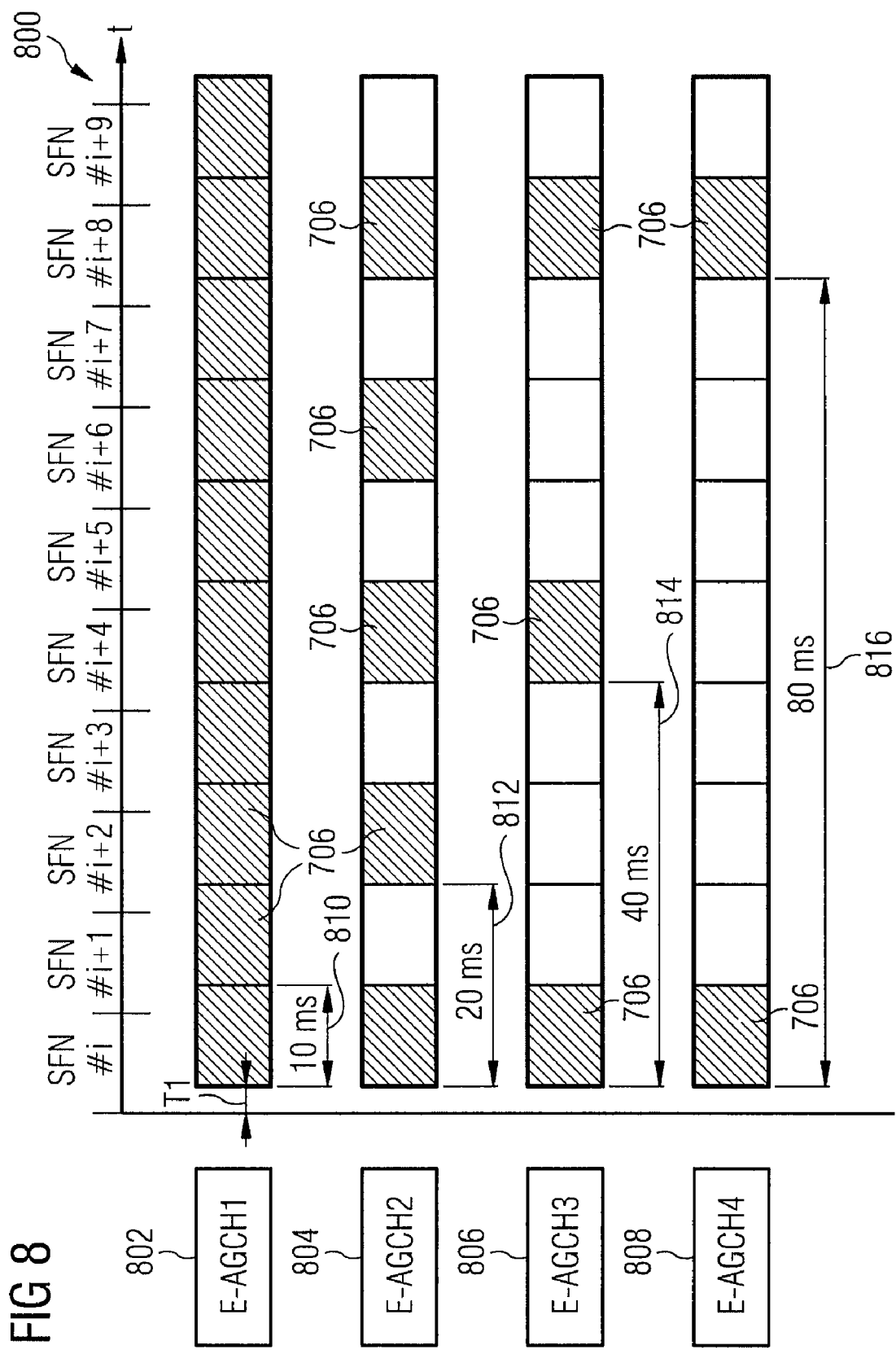

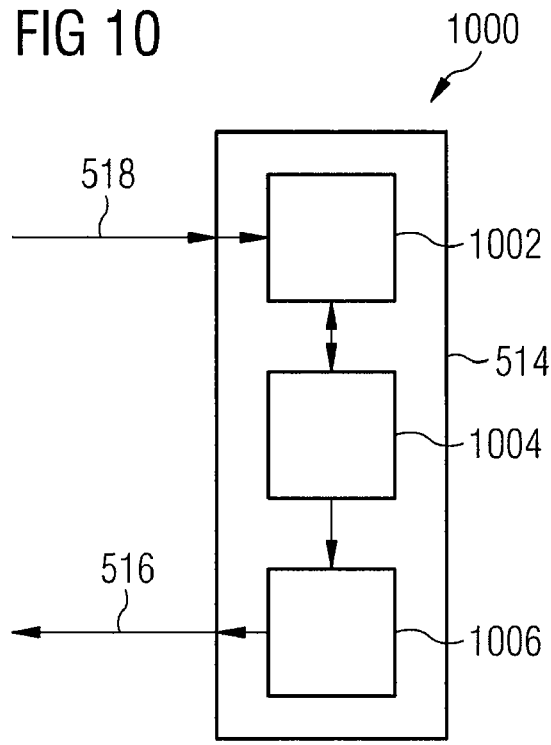
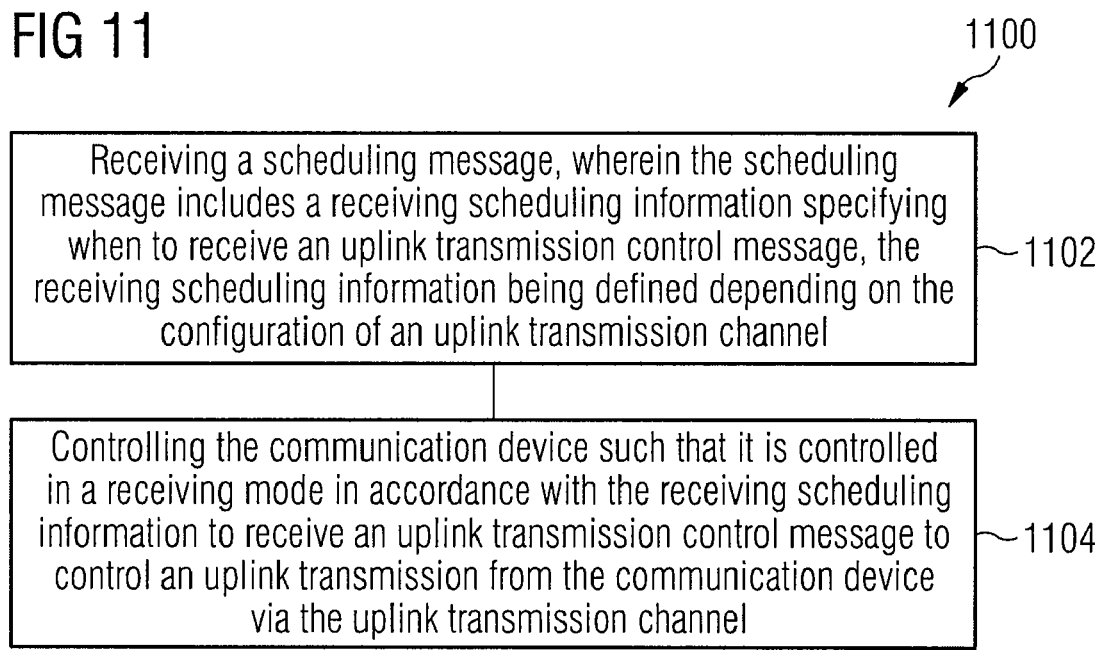

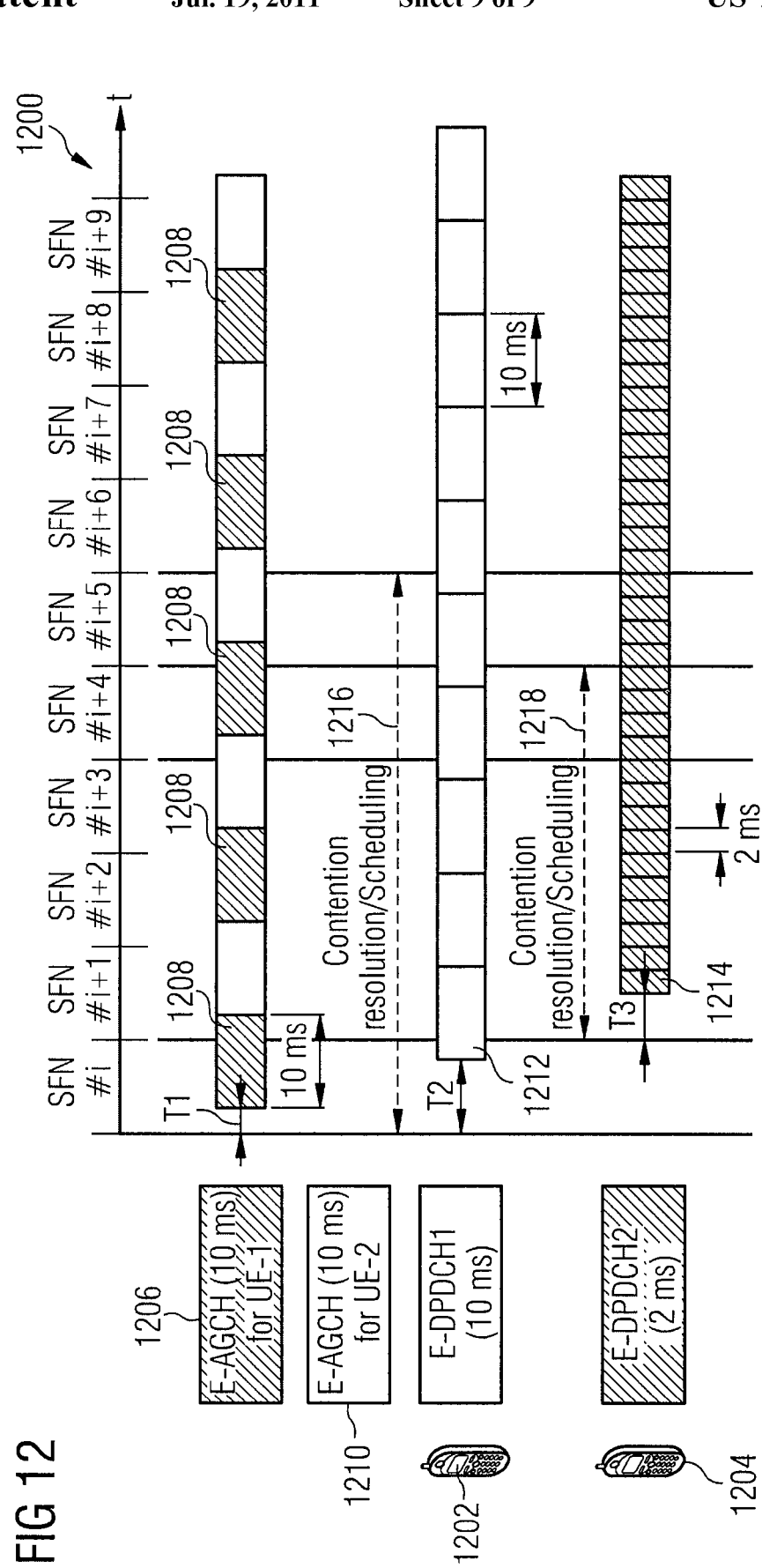

COMMUNICATION DEVICE, METHOD FOR TRANSMITTING AN UPLINK TRANSMISSION CONTROL MESSAGE, METHOD FOR RECEIVING AN UPLINK TRANSMISSION CONTROL MESSAGE

TECHNICAL FIELD

Embodiments relate generally to a communication device, to a method for transmitting an uplink transmission control message, and a method for receiving an uplink transmission control message.

BACKGROUND

A new Release 8 work item has been created in 3GPP standardization fora in order to enhance the performance of the RACH (Random Access Channel) transport channel for the UMTS (Universal Mobile Telecommunications System) FDD (Frequency Division Duplex) mode based on W-CDMA (Wideband Code Division Multiple Access). Objective of the work item is to enhance the RACH in terms of capacity, throughput and transmission delay. To achieve the goals the following techniques are considered: the E-DCH (Enhanced Dedicated Channel) transport channel is used in the RRC (Radio Resource Control) state CELL_FACH as common resource, support of 2 ms and 10 ms TTIs (Transmission Time Intervals), closed-loop power control, NodeB scheduling and HARQ (Hybrid Automatic Repeat Request). In each mobile radio cell up to 32 common E-DCH resources can be configured which are broadcast to all UEs (User Equipments) in a mobile radio cell.

As mentioned the E-DCH transport channel is subject to NodeB scheduling, i.e. NodeB controls the E-DCH radio resource of a UE. In more detail, NodeB transmits in downlink so-called scheduling grants which indicate to the UE the maximum allowed E-DPDCH (E-DCH Dedicated Physical Data Channel)/DPCCH (Dedicated Physical Control Channel) power ratio.

Two types of scheduling grants are specified:

i) Absolute Grants are sent on the E-AGCH (E-DCH Absolute Grant Channel) physical channel which provide an absolute limitation of the maximum allowed E-DPDCH/DPCCH power ratio the UE may use;

ii) Relative Grants are sent on the E-RGCH (E-DCH Relative Grant Channel) physical channel which provide a relative limitation of the maximum allowed E-DPDCH/DPCCH power ratio the UE may use.

The current working assumption regarding NodeB scheduling is that the UE has to monitor the E-AGCH physical channel every TTI (i.e. 2 ms or 10 ms). But this results in a high UE battery consumption.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a RACH (Random Access Channel) procedure according to UMTS FDD (Universal Mobile Telecommunications System Frequency Division Duplex) mode (W-CDMA, Wideband Code Division Multiple Access) in Release 7;

FIG. 2 shows an E-DCH (Enhanced Dedicated Channel) enhanced RACH procedure according to UMTS FDD mode (W-CDMA) in Release 8;

FIG. 3 shows the timing association of E-DCH absolute grant and E-DPDCH (E-DCH Dedicated Physical Data Channel) transmission for 10 ms TTI;

FIG. 4 shows the timing association of E-DCH absolute grant and E-DPDCH transmission for 2 ms TTI (Transmission Time Interval);

FIG. 5 shows a communication device according to an embodiment;

FIG. 6 shows the RRC (Radio Resource Control) state model according to an embodiment;

FIG. 7 shows a frame and a subframe structure for the E-AGCH (E-DCH Absolute Grant Channel) according to an embodiment;

FIG. 8 shows exemplary DRX (Discontinuous Reception) cycles for E-AGCH frame transmissions;

FIG. 10 shows a communication device according to an embodiment;

FIG. 11 shows a method for receiving an uplink transmission control message in a communication device according to one embodiment; and FIG. 12 shows a diagram illustrating an E-DCH resource contention resolution and scheduling in accordance with an embodiment.

DESCRIPTION

Figure 9:
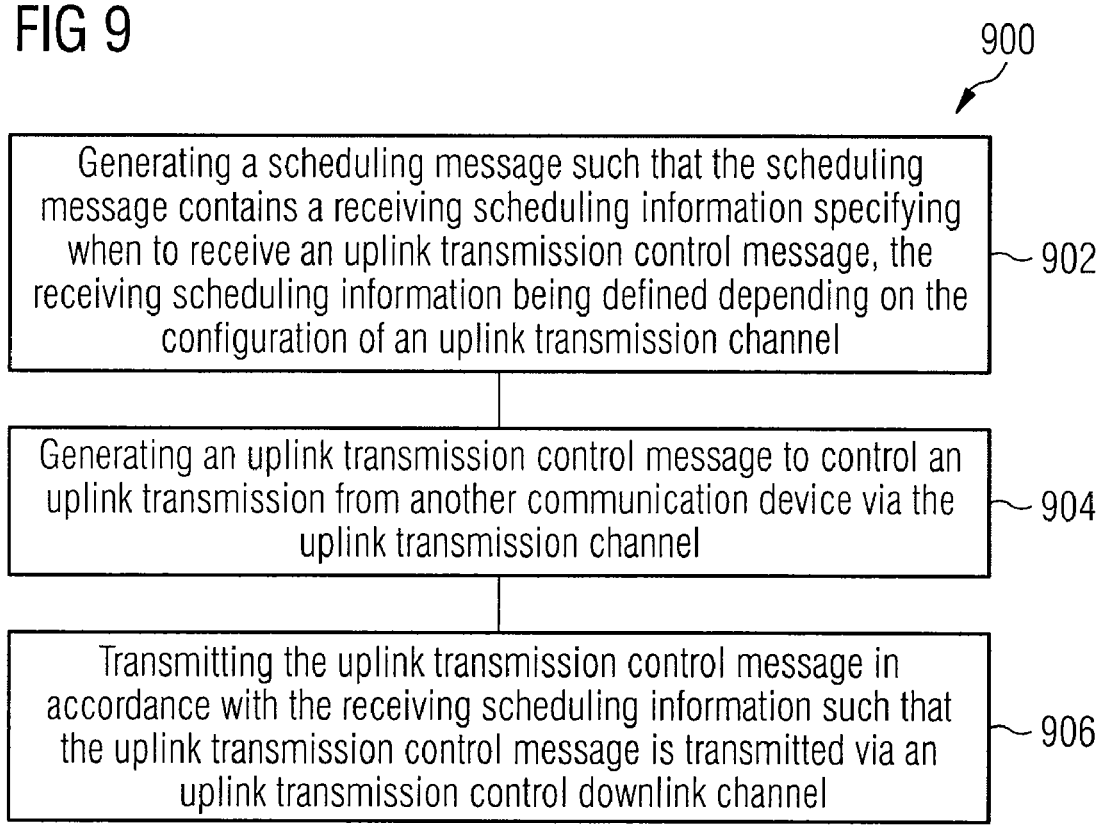
FIG. 9 shows a method for transmitting an uplink transmission control message in a communication device according to one embodiment.

Embodiments of the invention provide a method for controlling an uplink transmission using a uplink transmission control downlink channel. The controlling may include scheduling and contention resolution.

In the context of this description "uplink transmission" may be understood as a signal transmission from the mobile radio communication terminal (e.g. UE) to a respective (e.g. UMTS) base station, and "downlink transmission" may be understood as a signal transmission from a respective associated (e.g. UMTS) base station to a mobile radio communication terminal (e.g. UE).

Various embodiments provide and use a defined procedure for contention resolution and scheduling of E-DCH resources in CELL_FACH (Forward Access Channel) state, which is one of a plurality of predefined RRC states, a mobile radio communication terminal may be in according to e.g. UMTS or LTE (Long Term Evolution).

As will be described in more detail below, various embodiments achieve a reduction in UE battery consumption. Furthermore, considering the use-cases which can benefit from an E-DCH enhanced random access (transmission of medium-sized single packets such as RRC messages, HTTP (Hypertext Transfer Protocol) requests for web page downloads and always-on kind applications), limited duration of E-DCH resource allocation in CELL_FACH state (e.g. in the range of multiple of 100 ms) and the fact that the E-AGCH is also used for contention resolution (i.e. if two or more UEs select the same E-DCH resource for uplink transmission), the E-AGCH monitoring in every TTI would not be required in accordance with various embodiments.

Moreover, in various embodiments, a solution for the contention resolution and scheduling of E-DCH transport channel in CELL_FACH state is provided.

FIG. 1 shows a RACH procedure according to a UMTS FDD mode (W-CDMA) in Release 7 in a first signal transmission diagram 100.

In UMTS FDD mode according to Release 7 and based on W-CDMA, a random access procedure may be specified for the discontinuous transmission of limited amount of data in uplink transmission direction:

The Physical Random Access Channel (PRACH) 102 carries the RACH transport channel 104. The TTI 106 of a RACH message is 10 ms or 20 ms. In each radio cell up to 16 RACH/PRACH 102, 104, pairs can be configured which are broadcast to all UEs in the mobile radio cell. The RACH/PRACH 102, 104, pairs are common resources, i.e. they are shared among all UEs in the mobile radio cell.

The random access transmission is based on a slotted ALOHA approach, with a fast acquisition indication. The UE 110 can start the random access transmission at the beginning of a number of well-defined time intervals, denoted as access slots (AS) 108. There are 15 access slots per two radio frames and they are spaced 5120 chips apart.

The random access procedure starts with a PRACH preamble acquisition procedure, i.e. UE 110 transmits a preamble P (e.g. a first preamble 112 or a second preamble 116), of a length of 4096 chips with a predetermined transmission power at a randomly selected access slot 108.

If the NodeB 114 detects a preamble P (e.g. the second preamble P 116), a positive acknowledgement A 118 will be transmitted on the Acquisition Indicator Channel (AICH) 120 within the time $\tau_{p-a}$ 122. In this case, the UE 110 sends its data on the RACH/PRACH after a predetermined time $\tau_{p-m}$ 126.

If the NodeB 114 does not detect a preamble (even in case e.g. the first preamble P 112 has been sent by the UE 110), nothing is transmitted on the AICH 120 by the NodeB 114. In this case, the UE 110 usually transmits a randomly selected new preamble P (e.g. the second preamble P 116) at a randomly selected new access slot after a randomly selected time $\tau_{p-p}$ 124. This new preamble (e.g. the second preamble P 116) is usually transmitted with an increased transmission power.

After the transmission of the RACH/PRACH message(s), the procedure ends and for each subsequent transmission of uplink data, the above described procedure needs to be initiated again.

In the following, the UMTS E-DCH enhanced RACH procedure in FDD mode according to Release 8 is described.

FIG. 2 shows the high level concept of the E-DCH enhanced RACH procedure for the 10 ms E-DCH TTI case in a second signal transmission diagram 200.

The E-DCH Dedicated Physical Data Channel (E-DPDCH) carries the E-DCH transport channel. The E-DCH TTI 206 can be 2 ms or 10 ms. In each mobile radio cell up to 32 E-DCH/E-DPDCH 204 pairs can be configured which are broadcast to all UEs 110 in the mobile radio cell. The E-DCH/E-DPDCH pairs are common resources, i.e. are shared among all UEs 110 in the mobile radio cell.

The procedure starts with a PRACH preamble acquisition procedure as in Release 7 with AICH acknowledgement 118.

If NodeB 114 detects a preamble (e.g. the second preamble P 116), the UE 110 is assigned one of the common E-DCH resources consisting of the physical channels DPCCH (Dedicated Physical Control Channel), E-DPCCH und E-DPDCH 204 in uplink transmission direction, and F-DPCH (Fractional Dedicated Physical Channel), E-HICH (E-DCH HARQ Acknowledgement Indicator Channel), E-RGCH und E-AGCH 202 in downlink transmission direction. Once the E-DCH radio link is established, closed-loop power control will be applied over DPCCH and F-DPCH, scheduling grants will be sent by NodeB via E-AGCH and E-RGCH and ACK/NACK feedback in response to uplink transmissions on E-DCH/E-DPDCH will be sent on the E-HICH.

A fixed timing association is specified between the E-DCH absolute grant in downlink transmission direction and corresponding E-DPDCH transmission in uplink transmission direction. Basically, the UE 110 shall upon detection of an E-DCH absolute grant on E-AGCH intended for the UE 110, transmit on the E-DPDCH at the specified time instant based on the E-AGCH information. For illustration, two examples are given in FIG. 3 and FIG. 4.

FIG. 3 shows an example for the 10 ms case in a first diagram 300 and FIG. 4 shows an example for the 2 ms case in a second diagram 400.

In case of 10 ms, an E-AGCH 308 frame associated with SFN#i 302 corresponds to an E-DCH transmission in the E-DPDCH 310 frame associated with SFN#i+1+s. In FIG. 3, this is illustrated with the E-AGCH 308 frame SFN#i+1 304 and the correspondingly associated E-DPDCH 310 frame 306 (the association between the respective frames on the different channels is symbolized in FIG. 3 by means of an arrow 312).

In case of 2 ms, an E-AGCH 408 subframe#j of the E-AGCH 408 frame associated with SFN#i 402 corresponds to an E-DCH transmission in subframe#t of the E-DPDCH 410 frame associated with SFN#i+s. In FIG. 4, this is illustrated with the E-AGCH 408 subframe#j 404 and the correspondingly associated E-DPDCH 410 frame 406 (the association between the respective frames on the different channels is symbolized in FIG. 4 by means of an arrow 412).

The factor s depends on the UE-specific E-DPDCH timing. In RRC state CELL_DCH the E-DPDCH timing is configurable with T2=Tn×256+1024 chips with Tn={0, . . . , 149}.

Currently, the UE 110 monitors the E-AGCH physical channel 408 every TTI (i.e. 2 ms or 10 ms) what results in a high UE battery consumption. Further, E-AGCH 408 is currently not used for contention resolution as the E-DCH resource in RRC state CELL_DCH is a dedicated resource.

FIG. 5 shows in a block diagram 500 a communication device 502 according to an embodiment that includes a scheduling message generating circuit 504 configured to generate a scheduling message such that the scheduling message includes a receiving scheduling information specifying when to receive an uplink transmission control message. The receiving scheduling information is defined depending on a configuration of an uplink transmission channel 516. Furthermore, an uplink transmission control message generating circuit 506 may be provided which is configured to generate an uplink transmission control message to control an uplink transmission from another communication device 514 via the uplink transmission channel 516. Further, a transmitter circuit 508 may be provided which is configured to transmit the uplink transmission control message in accordance with the receiving scheduling information such that the uplink transmission control message is transmitted via an uplink transmission control downlink channel 518. In an embodiment, the generated scheduling message may be transmitted to the other communication device 514 in order to control its uplink transmission via its uplink transmission channel 516, as will be described in more detail further below.

In other words, illustratively, according to an embodiment, the communication device 502 schedules and controls an uplink transmission of another communication device 514. For this purpose, the communication device 502 may include a scheduling message generating circuit 504 and an uplink transmission control message generating circuit 506. The scheduling message generating circuit 504 may generate a message for scheduling the receiving times of uplink transmission control messages, e.g. for the other communication device 514, which is referred to in the following also as "second communication device". As the channel has defined characteristics, as e.g. a certain TTI for a certain communication device, the schedule may take into account these characteristics and may depend thereon. The uplink transmission control message generating circuit 506 may be configured to generate a message that contains information to control the uplink transmission, as e.g. information for contention resolution.

The uplink transmission control message is transmitted by the transmitter circuit 508 via an uplink transmission control downlink channel 518 to the second communication device 514. The uplink transmission of the second communication device 514 is performed via an uplink transmission channel 516 by the second communication device 514.

The communication device 502 may be, according to an embodiment of the invention, configured as a radio network communication device.

Thus, in various embodiments, the uplink and downlink channels 516, 518 may be radio channels, e.g. mobile radio channels. The radio communication system may include fixed communication devices only or mobile communication devices only or a combination of fixed and mobile communication devices.

The communication device may be, according to an embodiment, configured as a mobile radio network communication device.

The mobile radio network communication device may be a network communication device according to one of the following communication protocols or mobile radio communication technologies: UMTS (Universal Mobile Telecommunications System) or another mobile radio communication protocol such as a Third Generation Partnership project (3GPP) communication protocol, as e.g. UMTS Long Term Evolution (UMTS LTE), Code Division Multiple Access 2000 (CDMA 2000), FOMA (Freedom of Mobile Multimedia Access). Further, the mobile radio communication protocol may be a GSM-like communication protocol or a communication protocol derived or evolved from these communication protocols, such as e.g. EDGE (Enhanced Data rates for GSM Evolution) or so-called "Pre-4G" or "4G" communication protocols such as e.g. WiMAX (Worldwide Interoperability for Microwave Access).

The communication devices 502, 514 may negotiate phases, in which data transfer, e.g. in downlink direction occurs. This technique may also be referred to as discontinuous reception. These phases may be based on periodic intervals or cycles.

According to an embodiment, the receiving scheduling information of the communication device 502 is an information about a number of predefined discontinuous reception cycles for the uplink transmission control downlink channel.

As an example, the scheduling information is transmitted via an access grant channel being structured in radio frames and subframes. In this case, the scheduling information may, for example, indicate that access grant channel frame information for a specific communication device is transmitted e.g. either in every radio frame of the access grant channel, in every second radio frame, or in every fourth radio frame, and so on. A more detailed example will be presented further below.

According to an embodiment, the uplink transmission channel of the communication device is a shared channel.

By doing this, a very efficient use of the radio resources is achieved.

As shown in a state diagram 600 in FIG. 6, there are two modes and correspondingly provided states in which a mobile device may reside: the Idle Mode 602 with the RRC_idle state 604 and the RRC Connected mode 614 which contains the Cell_DCH state 606, the Cell_FACH state 608, the URA_PCH state 610 and the Cell_PCH state 612. The respective communications protocol states will be described in more detail below.

The uplink transmission channel may be a channel used conventionally in a RRC connection state where dedicated channels are allocated for a mobile communication device, as e.g. the RRC CELL_DCH state in, e.g. UMTS, and which is, according to an embodiment, used in a further RRC state, as e.g. the RRC CELL_FACH state.

Thus, the uplink transmission channel of the communication device may be, according to an embodiment, a dedicated channel used as a shared channel.

According to an embodiment, the dedicated channel of the communication device is a DCH transport channel or an E-DCH transport channel.

The E-DCH transport channel may be an E-DCH channel as used in wireless or radio systems as e.g. the communication listed above, containing e.g. E-HICH (E-DCH HARQ Acknowledgement Indicator Channel), E-AGCH (E-DCH Absolute Grant Channel) und E-RGCH (E-DCH Relative Grant Channel) and in the uplink transmission case relevant in an embodiment, also the E-DPCCH (E-DCH Dedicated Physical Control Channel) and the E-DPDCH (E-DCH Dedicated Physical Data Channel).

The E-DPDCH and the E-DPCCH may be connected with each other directly because the signalling channel E-DPCCH transmits information about the characteristics of the data channel E-DPDCH. The E-DPDCH transports the data payload and supports the so-called AMC (Adaptive Modulation and Coding) with HARQ. The length of the E-DCH-subframes may be e.g. 2 ms or 10 ms.

The E-HICH is a downlink physical channel used by the HARQ process to acknowledge E-DCH transmissions from the UE.

The E-AGCH is a shared downlink physical channel used to indicate to the UE how much data can be sent on the uplink, allowing it to determine the E-DCH TFC (Transport Format Combination) and maximum allowed power.

The E-RGCH is a downlink physical channel used to increase or decrease the uplink resources compared to the previously used value.

Further information about the channels is given in more detail further below.

According to an embodiment, the second communication device 514 is a terminal communication device.

According to a further embodiment of the invention, the terminal communication device 514 is a radio terminal communication device, e.g. a mobile radio terminal communication device.

The mobile radio terminal communication device may be a communication device using a communication protocol or communication technology according to one of the communication systems listed above or communication protocol or communication technology based on or similar to the protocols of these communication systems.

According to an embodiment, the uplink transmission control downlink channel 518 of the first communication device 502 is a DCH Absolute Grant Channel. According to an embodiment, the DCH Absolute Grant Channel of the communication device is an E-DCH Absolute Grant Channel.

The E-DCH Absolute Grant Channel may be a channel having the characteristics of the E-AGCH physical channel according to Release 7. It may thus be a fixed rate (e.g. 30 kbps, SF=256) downlink physical channel carrying the uplink E-DCH absolute grant.

FIG. 7 illustrates the frame and subframe structure of the E-AGCH 114 in a frame diagram 700. An E-DCH absolute grant may be transmitted via one E-AGCH subframe 702 of a length of 2 ms or one E-AGCH frame 704 of a length of 10 ms. The E-AGCH 114 carries on a subframe 60 channel coded bits and 22 information bits, respectively, for example:

Absolute Grant Scope: 1 bit; indicates whether the Absolute Grant is applicable to "Per HARQ process" or "All HARQ process";

Absolute Grant Value: 5 bits; indicates the maximum E-DPDCH/DPCCH power ratio that the UE is allowed to use in the next transmission;

A CRC-specific masked E-RNTI (E-DCH Radio Network Temporary Identity) of a length of 16 bits.

The duration of an E-AGCH 114 is same as an E-DCH TTI, i.e. for example 2 ms or 10 ms. In case of a duration of 2 ms, the E-AGCH 114 carries only a single E-DCH absolute grant, whereas in case of 10 ms, the E-AGCH 114 carries a single E-DCH absolute grant, which is transmitted in all 5 subframes 705 of the E-AGCH frame 706. On timing an E-AGCH frame 706 is offset relative to the radio frame structure with $T1=5120$ chips ($\approx 1.33$ ms) and 1 chip=0.261 µs, as shown in FIG. 3 and FIG. 4.

According to an embodiment, the uplink transmission control downlink channel 518 of the first communication device 502 is a downlink channel configured to transmit scheduling information.

An example of the scheduling is given in the following.

DRX (Discontinuous Reception) cycles may be defined for E-AGCH frame transmissions. As shown in another frame diagram 800 in FIG. 8, exemplary DRX cycles for E-AGCH frame transmissions will be described in more detail below:

E-AGCH1 802: DRX cycle 1 (the length of DRX cycle 1 is denoted in FIG. 8 with reference number 810), wherein an E-AGCH frame 704 can be transmitted in every radio frame of a length of 10 ms. The length of the DRX cycle 1 may be 10 ms.

E-AGCH2 804: DRX cycle 2 (the length of DRX cycle 2 is denoted in FIG. 8 with reference number 812), wherein an E-AGCH frame 704 can be transmitted in every second radio frame of a length of 10 ms. The length of the DRX cycle 2 may be 20 ms (in general, longer than the DRX cycle 1, e.g. longer by an integer multiple of DRX cycle 1).

E-AGCH3 806: DRX cycle 3 (the length of DRX cycle 3 is denoted in FIG. 8 with reference number 814), wherein an E-AGCH frame 704 can be transmitted in every fourth radio frame of a length of 10 ms. The length of the DRX cycle 3 may be 40 ms (in general, longer than the DRX cycle 1 and/or DRX cycle 2, e.g. longer by an integer multiple of DRX cycle 1 and/or DRX cycle 2).

E-AGCH4 808: DRX cycle 4 (the length of DRX cycle 4 is denoted in FIG. 8 with reference number 816), wherein E-AGCH frame 704 can be transmitted in every eighth radio frame of a length of 10 ms. The length of the DRX cycle 4 may be 80 ms (in general, longer than the DRX cycle 1 and/or DRX cycle 2 and/or DRX cycle 3, e.g. longer by an integer multiple of DRX cycle 1 and/or DRX cycle 2 and/or DRX cycle 3).

In an embodiment, it may be provided that for each E-DCH configuration defined in a radio cell, a resource-specific E-AGCH frame periodicity (=scheduling occasion) may be signaled.

Furthermore, in another embodiment, this resource-specific E-AGCH frame periodicity may be defined by a network component, e.g. depending on the overall number of E-DCH configurations, on the E-DCH TTIs supported and on the transmission capacity supported in a radio cell.

In an implementation, during the contention resolution window the network can send scheduling grants and contention resolution commands on E-AGCH 114. However, in an implementation, it may be provided that after the contention resolution window, the network can send only scheduling grants on E-AGCH 114.

In case of a 2 ms E-DCH TTI, the E-AGCH 114 only carries a single E-DCH absolute grant, i.e. the UE monitors the complete E-AGCH frame 704 and checks, on which subframe its E-DCH absolute grant may be transmitted. In case of a 10 ms E-DCH TTI, the E-AGCH 114 carries a single E-DCH absolute grant which is transmitted in all five subframes of the E-AGCH frame 704.

According to an embodiment, the uplink transmission control downlink channel 518 of the first communication device 502 is a downlink channel configured to transmit contention resolution information.

As the uplink channel is a shared channel which is accessed by a communication device only when it has to transmit data, contention resolution may get useful.

For contention resolution e.g. the following parameters may be transmitted on the E-AGCH 114:

an index of E-DCH configuration; and/or
a UE-Id for contention resolution.

Contention resolution may be performed only during a contention resolution window (i.e. the first number of N radio frames), beginning with the radio frame in which the E-DCH transmission initially started.

Two types of contention resolution methods may be supported in accordance with an embodiment:

Explicit contention resolution by explicit transmission of E-AGCH contention resolution command;

Implicit contention resolution after expiry of contention resolution window.

According to an embodiment, the transmitter circuit 508 of the communication device 502 may be configured to transmit the uplink transmission control message when the communication device 502 is in a predefined communication protocol state.

Such communications protocol states as described above may define states of a communication connection, in which a communication device may be in. For each communications protocol state, a different set of communication resources such as e.g. communications channels may be provided. Each resource may have communications protocol state-specific characteristics and the communication device may perform defined actions such as e.g. setting up a call, releasing a call, sleeping, awaking, communicating e.g. in a certain mode, and so on. A characteristic of a state model is that only defined transitions from one to another state are allowed wherein the transition may depend on pre-defined conditions.

According to an embodiment, the transmitter circuit 508 of the communication device may be configured to transmit the uplink transmission control message when the communication device is in a predefined radio resource control state.

The RRC states are illustrated in the state diagram 600 in FIG. 6 and will described in the following using UMTS as an example.

In UMTS there are two RRC modes, the idle mode 602 and the connected mode 614.

In UMTS RRC idle mode 602 there is only one state, RRC_idle state 604. The RRC_idle state 604 is entered after switching on the mobile device. In RRC_idle 604, the UTRAN has no information about the mobile device. In downlink transmission direction, the mobile devices may listen to the PICH/PCH (Paging Indicator CHannel/Paging Channel). To change into the RRC connected mode 614, a paging signal has to be detected. The PICH serves e.g. as a wake-up signal in the RRC_idle state 604. The UTRAN can only send information to mobile devices in Idle Mode 602 by sending a broadcast message, e.g., inside a mobile radio cell. In uplink transmission direction, the UE sends an RRC_CONNECTION_REQ message on the RACH to change into the RRC Connected Mode 614.

In accordance with UMTS, the UE enters the CELL_FACH state 608 or the CELL_DCH 606 state when it receives a message from the network that confirms the RRC communication connection establishment.

In the following, only some features of the four UMTS RRC states 606, 608, 610, 612 of the connected mode RRC Connected 614 are described.

One of the connected mode states is the CELL_DCH state 606. In the CELL_DCH state 606, a dedicated physical channel is allocated to the mobile radio communication device in uplink transmission direction and downlink transmission direction. The mobile device sends measurement reports (in other words, measurement report messages) to the RNC (Radio Network Controller) according to the RNC setup. The mobile device enters the CELL_DCH 606 state when setting up an RRC connection, e.g. from the RRC_idle state 604 or by establishing a dedicated physical channel, e.g. from the CELL_FACH state 608.

The CELL_FACH state 608 is a further state of the connected mode 614. In the CELL_FACH state 608, no dedicated physical channel is allocated to the mobile device. Uplink and downlink transmissions are carried out by common channels, e.g. FACH in downlink and RACH in uplink. The mobile radio communication device listens to the BCH (Broadcast Channel) transport channel of the serving mobile radio cell for the decoding of system information messages.

A third state of the connected mode 614 is the CELL_PCH state 612. In the CELL_PCH state 612 only a signalling connection is allocated to the mobile radio communication terminal device. In the CELL_PCH state 612, the mobile radio communication terminal device monitors the PCH (paging channel). Furthermore, the mobile radio communication terminal device listens to the BCH transport channel of the serving cell for the decoding of system information messages. As the DCCH logical channel cannot be used in the CELL_PCH state 612, the network sends a paging request on the PCCH in order to initiate any downlink transmission activity.

The fourth state in connected mode 614 is the URA_PCH state 610. The URA_PCH state 610 is similar to the CELL_PCH state 612 and basically differs from the CELL_PCH state 612 in that the mobile radio communication terminal device is known by network only among a set of cells referred to as URA (UTRAN registration area).

As explained, in UMTS CELL_DCH state 606, there exists a dedicated physical channel DCH, or in advanced releases, the E-DCH for which a subset of logical channels is defined as described further above. This channel may, according to an embodiment, also be used in the CELL_FACH state 608. However, the channel may be used as a shared channel in this case.

According to an embodiment, the transmitter circuit 508 of the communication device 502 may be configured to transmit the uplink transmission control message when the communication device is in the radio resource control state CELL_FACH 608.

I.e., the uplink transmission control message may be transmitted in the CELL_FACH state 608, e.g. via an E-AGCH or an E-RGCH, to control the uplink transmission, e.g. via the E-DCH transport channel.

According to an embodiment, a method 900 for transmitting an uplink transmission control message in a communication device may be provided, as shown in FIG. 9. The method may include, in 902, generating a scheduling message such that the scheduling message contains a receiving scheduling information specifying when to receive an uplink transmission control message, the receiving scheduling information being defined depending on a configuration of an uplink transmission channel. The scheduling message may be transmitted from the mobile radio communication network device, such as e.g. an RNC, to the mobile radio communication terminal device, the receiving scheduling (in general, the receiving activation characteristics) should be controlled by the receiving scheduling information included in the scheduling message. Furthermore, in 904, an uplink transmission control message may be generated to control an uplink transmission from another communication device (e.g. the mobile radio communication terminal device) via the uplink transmission channel, and, in 906, the uplink transmission control message may be transmitted in accordance with the receiving scheduling information such that the uplink transmission control message is transmitted via an uplink transmission control downlink channel.

In other words, a message is transmitted in downlink direction that contains information by which the uplink transmission of e.g. a second communication device is controlled. According to this method, first, a message may be generated including time scheduling information indicating when the second communication device shall receive the uplink transmission control message and therewith the information for controlling the uplink transmission from the second communication device. The scheduling information may be based on the configuration of the uplink transmission channel. Next, an uplink transmission control message may be generated and transmitted according to the information of the scheduling message via a downlink channel which is configured to transmit such an uplink transmission control message to the second communication device.

According to an embodiment, the communication device of the method 900 may be configured as a radio network communication device. In a radio network communication device radio uplink and downlink channels according to a radio communication protocol may be used. The radio communication system may include fixed line communication devices only or mobile communication devices only or a combination of fixed line communication devices and mobile communication devices.

According to an embodiment, the communication device carrying out the method 900 may be configured as a mobile radio network communication device.

The mobile radio network may be a network according to one of the following communication protocols: UMTS (Universal Mobile Telecommunications System) or another mobile radio communication protocol such as a Third Generation Partnership project (3GPP) communication protocol, such as e.g. UMTS Long Term Evolution (UMTS LTE), Code Division Multiple Access 2000 (CDMA 2000), FOMA (Freedom of Mobile Multimedia Access). Further, the mobile radio communication protocol may be a GSM-like communication protocol or a communication protocol derived or evolved from these communication protocols, such as e.g. EDGE (Enhanced Data rates for GSM Evolution) or so-called "Pre-4G" or "4G" communication protocols such as e.g. WiMAX (Worldwide Interoperability for Microwave Access).

According to an embodiment of the invention, the receiving scheduling information of method 900 is an information about a number of predefined discontinuous reception cycles for the uplink transmission control downlink channel. In an embodiment, a discontinuous reception cycle may be understood a cyclically repeated time period including active phases for receiving the uplink transmission control downlink channel and inactive phases where the uplink transmission control downlink channel is not transmitted. The discontinuous reception cycle may e.g. have the length of one or more frames (e.g. a multiple of, e.g. an integer multiple of the length of a frame.

An example of the scheduling is shown in FIG. 8 where four different cases of discontinuous reception cycles are shown; each discontinuous reception cycle having a specific length being different from the lengths of the other discontinuous reception cycles. The scheduling information may, for example, indicate that access grant channel frame information for a specific uplink transmission channel is transmitted e.g. either in every radio frame of the access grant channel, in every second radio frame, or in every fourth radio frame, etc.

According to an embodiment, the uplink transmission channel of the method 900 may be a shared channel.

This means that several communication devices may use the same channel which is on the one hand resource-efficient but might on the other hand lead to a contention when a slotted ALOHA access is applied. This may be resolved with a contention resolution as described herein.

According to an embodiment, the uplink transmission channel of the method 900 may be a dedicated channel used as a shared channel.

According to an embodiment, the dedicated channel of the method 900 is a DCH transport channel or an E-DCH transport channel.

According to an embodiment, the second communication device of the method 900 is a terminal communication device.

According to an embodiment, the terminal communication device of the method 900 is a radio terminal communication device, e.g. a mobile radio terminal communication device.

According to an embodiment of the invention, the uplink transmission control downlink channel of the method 900 is a downlink transmission channel configured to transmit uplink transmission control message.

According to an embodiment, the uplink transmission control downlink channel of the method 900 is a transmission downlink channel configured to transmit contention resolution information.

According to an embodiment, the uplink transmission control downlink channel of the method 900 is a DCH Absolute Grant Channel.

According to an embodiment, the DCH Absolute Grant Channel of the method 900 is an E-DCH Absolute Grant Channel.

The E-DCH Absolute Grant Channel may be a channel having the characteristics of the E-AGCH physical channel according to Release 7. It may thus be a fixed rate (e.g. 30 kbps, SF=256) downlink physical channel carrying the uplink E-DCH absolute grant. The frame and subframe structure of the E-AGCH was explained above with reference to FIG. 7.

According to an embodiment, the uplink transmission control message of the method 900 may be transmitted when the communication device is in a predefined communication protocol state, e.g. in a predefined radio resource control state.

According to an embodiment, the uplink transmission control message of the method 900 may be transmitted when the communication device is in the radio resource control state CELL_FACH.

According to an embodiment, a communication device 514 may be provided as illustrated in a block diagram 1000 in FIG. 10, including a receiver circuit 1002 configured to receive radio signals, e.g. carrying e.g. a scheduling message, wherein the scheduling message contains a receiving scheduling information specifying when to receive an uplink transmission control message, the receiving scheduling information being defined depending on a configuration of an uplink transmission channel 516. Furthermore, the communication device 514 may include a controller 1004 configured to control the communication device 514 or some of its components such that it is controlled in a receiving mode in accordance with the receiving scheduling information to receive an uplink transmission control message to control an uplink transmission from the communication device via the uplink transmission channel 516. In other words, the controller 1004 may be configured to control/activate components of the communication device 514 provided to receive the scheduling message, and, in accordance with the then received scheduling information, to receive a following uplink transmission control message.

In other words, a communication device 514 is provided with a receiver circuit 1002 that receives a scheduling message containing information at which point of time the communication device 514 may receive an uplink transmission control message. After having received the uplink transmission control message, the controller 1004 may then control the uplink transmission via the uplink transmission channel 516 using the information included in the received uplink transmission control message.

According to an embodiment, the communication device 514 may further contain a transmitter circuit 1006 configured to provide uplink transmission to another communication device via the uplink transmission channel 516.

In FIG. 10 also the transmit circuit 1006 is shown, which is configured to transmit the uplink data via the uplink transmission channel 516 to a first communication device, such as e.g. the communication device 502 in FIG. 5.

According to an embodiment, the communication device 514 may be configured as a radio terminal communication device.

The radio terminal communication may e.g. be a user terminal.

According to an embodiment, the communication device 514 may be configured as a mobile radio terminal communication device.

The radio or the mobile radio network, respectively, may be a network according to one of the following communication protocols: UMTS (Universal Mobile Telecommunications System) or another mobile radio communication protocol such as e.g. a Third Generation Partnership project (3GPP) communication protocol, as e.g. UMTS Long Term Evolution (UMTS LTE), Code Division Multiple Access 2000 (CDMA 2000), FOMA (Freedom of Mobile Multimedia Access). Furthermore, the mobile radio communication protocol may be a GSM-like communication protocol or a communication protocol derived or evolved from these communication protocols, as e.g. EDGE (Enhanced Data rates for GSM Evolution) or so-called "Pre-4G" or "4G" communication protocols such as e.g. WiMAX (Worldwide Interoperability for Microwave Access).

According to an embodiment, the receiving scheduling information of the communication device 514 may be an information about a number of predefined discontinuous reception cycles for the uplink transmission control downlink channel.

According to an embodiment, the uplink transmission channel 516 of the communication device 514 may be a shared channel, e.g. a dedicated channel used as a shared channel.

According to an embodiment, the dedicated channel of the communication device may be a DCH transport channel or an E-DCH transport channel.

According to an embodiment, the other communication device may be a network communication device.

A network communication device may e.g. be a device that belong to the network side of the communication system infrastructure.

According to an embodiment, the network communication device is a radio network communication device.

A radio network communication device may e.g. be a base station or a NodeB in UMTS or an eNodeB in LTE.

According to an embodiment, the radio terminal communication device is a mobile radio terminal communication device.

According to an embodiment, the uplink transmission control downlink channel of the communication device is a downlink transmission channel configured to transmit uplink transmission control message.

According to an embodiment, the uplink transmission control downlink channel of the communication device is a downlink transmission channel configured to transmit contention resolution information.

According to an embodiment, the uplink transmission control downlink channel of the communication device is a DCH Absolute Grant Channel.

According to an embodiment, the DCH Absolute Grant Channel of the communication device of is an E-DCH Absolute Grant Channel.

According to an embodiment, the receiver circuit 1002 of the communication device 514 may be configured to receive the uplink transmission control message when the communication device is in a predefined communication protocol state, e.g. when the communication device 514 is in a predefined radio resource control state.

According to an embodiment, the receiver circuit 1002 of the communication device 514 may be configured to receive the uplink transmission control message when the communication device is in the radio resource control state CELL_FACH.

According to an embodiment, the receiving scheduling information is defined depending on a selected configuration of an uplink transmission channel out of a plurality of configurations of an uplink transmission channel. The controller may be configured to control the communication device such that it is controlled in a receiving mode in accordance with the receiving scheduling information in accordance with the selected one configuration of an uplink transmission channel.

According to an embodiment, a method 1100 for receiving an uplink transmission control message in a communication device is provided as shown in a flow diagram 1100 in FIG. 11. The method 100 may include, in 1102, receiving a scheduling message, wherein the scheduling message includes a receiving scheduling information specifying when to receive an uplink transmission control message, the receiving scheduling information being defined depending on a configuration of an uplink transmission channel. Furthermore, in 1104, the communication device may be controlled such that it is controlled in a receiving mode in accordance with the receiving scheduling information to receive an uplink transmission control message to control an uplink transmission from the communication device via the uplink transmission channel.

According to an embodiment, the method 1100 may further include providing uplink transmission to another communication device via the uplink transmission channel.

According to an embodiment, the communication device carrying out the method 1100 may be configured as a radio terminal communication device, e.g. as a mobile radio terminal communication device.

According to an embodiment, the receiving scheduling information of the method 1100 may be an information about a number of predefined discontinuous reception cycles for the uplink transmission control downlink channel.

According to an embodiment of the invention, the uplink transmission channel of the method may be a shared channel, e.g. a dedicated channel used as a shared channel.

According to an embodiment, the dedicated channel of the method may be a DCH transport channel or an E-DCH transport channel.

According to an embodiment, the other communication device of the method may be a network communication device.

According to an embodiment, the terminal communication device of the method is a radio terminal communication device.

According to an embodiment, the radio terminal communication device of the method may be a mobile radio terminal communication device.

According to an embodiment, the uplink transmission control downlink channel of the method may be a downlink transmission channel configured to transmit uplink transmission control message.

According to an embodiment, the uplink transmission control downlink channel of the method may be a downlink transmission channel configured to transmit contention resolution information.

According to an embodiment, the uplink transmission control downlink channel of the method may be a DCH Absolute Grant Channel.

According to an embodiment, the DCH Absolute Grant Channel of the method may be an E-DCH Absolute Grant Channel.

According to an embodiment, the uplink transmission control message of the method may be received when the communication device is in a predefined communication protocol state, e.g. when the communication device is in a predefined radio resource control state.

According to an embodiment, the uplink transmission control message of the method may be received when the communication device is in the radio resource control state CELL_FACH.

According to an embodiment, a communication device may be provided including a scheduling message generating circuit configured to generate a scheduling message such that the scheduling message contains a receiving scheduling information specifying when to receive an uplink transmission control message, the receiving scheduling information being defined depending on a configuration of an uplink transmission channel; an uplink transmission control message generating circuit configured to generate an uplink transmission control message to control an uplink transmission from another communication device via the uplink transmission channel; and a transmitter circuit configured to transmit via an uplink transmission control downlink channel; a contention resolution information or an uplink transmission control message during a first predefined time period; only an uplink transmission control message during a second predefined time period, the second time period being different from the first predefined time period.

Various embodiments may provide one or more defined procedures for contention resolution and scheduling of E-DCH resources in CELL_FACH state of a mobile radio communication device. Furthermore, various embodiments may provide a simplification of common E-DCH resource scheduling in terms of radio resource efficiency (from network perspective) and battery consumption (from UE point of view) in CELL_FACH state.

Without loss of generality the following example configuration is considered in the following example implementation, which is illustrated in a diagram 1200 in FIG. 12:
- UMTS FDD mode according to Release 8 based on W-CDMA is provided.
- The mobile radio cell is configured to support the E-DCH enhanced RACH procedure.
- In the mobile radio cell, only two common E-DCH resources are configured and broadcast with the following parameters:
    - E-DCH configuration 1:
        - E-DCH configuration index
        - Uplink DPCH Info
        - E-DCH Info
        - E-AGCH Info
            - frame periodicity=2 with offset 0 frame
            - Contention resolution window=6
        - E-RGCH Info
        - E-HICH Info
        - DL F-DPCH Info
        - E-DCH Start Time
        - E-DCH TTI
            - 10 ms
        - Maximum uplink transmit power
    - E-DCH configuration 2:
        - E-DCH configuration index
            - 2
        - Uplink DPCH Info
        - E-DCH Info
        - E-AGCH Info
            - frame periodicity=2 with offset 1 frame
            - contention resolution window=4
        - E-RGCH Info
        - E-HICH Info
        - DL F-DPCH Info
        - E-DCH Start Time
        - E-DCH TTI
            - 2 ms
        - Maximum uplink transmit power In this example, it is assumed that two UEs, e.g. a first UE-1 1202 and a second UE-2 1204, have performed the E-DCH RACH procedure successfully, and as a result, the first UE-1 1202 has been assigned the above described first E-DCH configuration 1 and the second UE-2 1204 has been assigned the above described second E-DCH configuration 2 for uplink transmissions.

Furthermore, FIG. 12 shows a first E-AGCH (with 10 ms) 1206 for the first UE-1 1202, the first E-AGCH 1206 having 10 ms long frames SFN#i 1208, and a second E-AGCH (with 10 ms) 1210 for the second UE-11204.

In this example, the first UE-1 1202 starts its uplink transmission using E-DCH configuration 1 in a radio frame SFN #i 1212 with an offset T2, whereas the second UE-2 1204 starts its uplink transmissions using E-DCH configuration 2 in a radio frame SFN #i+1 1214 with an offset T3.

Furthermore, in this example, the contention resolution and scheduling for the first UE-1 1202 may be applied as follows:
- The first UE-1 1202 monitors the E-AGCH 1206 frame transmissions only at the resource-specific DRX cycle for contention resolution and scheduling (in this example, the DRX cycle is two frames).
- During the first contention resolution window 1216 (i.e. the first six radio frames from SFN #i to SFN #i+5), the respective NodeB can send either one or more contention resolution commands or one or more scheduling grants on the first E-AGCH 1206. After the first contention resolution window 1216, in this example, the respective NodeB will send only scheduling grants on the first E-AGCH 1206 (and no contention resolution commands). The first E-AGCH 1206 may carry a single contention resolution command or E-DCH absolute grant which is transmitted in all five subframes of the E-AGCH frame.

The contention resolution and scheduling for the second UE-2 1204 may be applied as follows:
- The second UE-2 1204 monitors the E-AGCH 1210 frame transmissions only at the resource-specific DRX cycle for contention resolution and scheduling.
- During the second contention resolution window 1218 (i.e. the first four radio frames from SFN #i+1 to SFN #i+4), the respective NodeB can send either one or more contention resolution commands or one or more scheduling grants on the E-AGCH 1210. After the second contention resolution window 1218, the respective NodeB will send only scheduling grants on E-AGCH 1210 (and no contention resolution commands). The E-AGCH 1210 frame may carry a single contention resolution command or E-DCH absolute grant of a length of 2 ms, i.e. the second UE-2 1204 monitors the complete E-AGCH frame and checks on which subframe its contention resolution command or E-DCH absolute grant is transmitted.

Various embodiments provide a solution for the contention resolution and scheduling of E-DCH transport channel in CELL_FACH state with the following characteristics, wherein in different embodiments, the features described below can be provided in any arbitrary combination:
- For each common E-DCH configuration a resource-specific DRX cycle for E-AGCH frame transmissions may be defined.
- Depending on the selected common E-DCH configuration, a UE may monitor the E-AGCH frame transmissions only at the resource-specific DRX cycle for contention resolution and scheduling.
- During a first transmission window (which may be also referred to as contention resolution window), it may be provided that the network (e.g. an RNC or a base station, e.g. a NodeB or an eNodeB) can send scheduling grants and contention resolution commands on E-AGCH.
- After the first transmission window (which may be also referred to as contention resolved window), it may be provided that the network (e.g. an RNC or a base station, e.g. a NodeB or an eNodeB) can send only scheduling grants on E-AGCH.

A procedure for contention resolution and scheduling may be performed irrespective of TTI of E-DCH resource.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a scheduling message generating circuit configured to generate a scheduling message such that the scheduling message comprises a receiving scheduling information specifying when to receive an uplink transmission control message, the receiving scheduling information being defined depending on a configuration of an uplink transmission channel;
   an uplink transmission control message generating circuit configured to generate an uplink transmission control message to control an uplink transmission from another communication device via the uplink transmission channel; and
   a transmitter circuit configured to transmit the uplink transmission control message in accordance with the receiving scheduling information such that the uplink transmission control message is transmitted via an uplink transmission control downlink channel.

2. The communication device of claim 1,
   being configured as a radio network communication device.

3. The communication device of claim 1,
   wherein the receiving scheduling information is an information about a number of predefined discontinuous reception cycles for the uplink transmission control downlink channel.

4. The communication device of claim 1,
   wherein the uplink transmission channel is a shared channel.

5. The communication device of claim 1,
   wherein the transmitter circuit is configured to transmit the generated scheduling message in order to control the uplink transmission of the other communication device.

6. The communication device of claim 1,
   wherein the uplink transmission control downlink channel is a downlink channel configured to transmit uplink transmission control message.

7. The communication device of claim 1,
   wherein the uplink transmission control downlink channel is a downlink channel configured to transmit contention resolution information.

8. The communication device of claim 1,
   wherein the uplink transmission control downlink channel is an E-DCH Absolute Grant Channel.

9. The communication device of claim 1,
   wherein the transmitter circuit is configured to transmit the uplink transmission control message when the communication device is in a predefined communication protocol state.

10. The communication device of claim 9,
    wherein the transmitter circuit is configured to transmit the uplink transmission control message when the communication device is in a predefined radio resource control state.

11. The communication device of claim 10,
    wherein the transmitter circuit is configured to transmit the uplink transmission control message when the communication device is in the radio resource control state CELL_FACH.

12. A method for transmitting an uplink transmission control message in a communication device, the method comprising:
    generating a scheduling message such that the scheduling message comprises a receiving scheduling information specifying when to receive an uplink transmission control message, the receiving scheduling information being defined depending on a configuration of an uplink transmission channel;
    generating an uplink transmission control message to control an uplink transmission from another communication device via the uplink transmission channel; and
    transmitting the uplink transmission control message in accordance with the receiving scheduling information such that the uplink transmission control message is transmitted via an uplink transmission control downlink channel.

13. The method of claim 12,
    wherein the communication device is configured as a radio network communication device.

14. The method of claim 12,
    wherein the receiving scheduling information is an information about a number of predefined discontinuous reception cycles for the uplink transmission control downlink channel.

15. The method of claim 12,
    wherein the uplink transmission control downlink channel is an E-DCH Absolute Grant Channel.

16. The method of claim 12,
    wherein the uplink transmission control message is transmitted when the communication device is in a predefined communication protocol state.

17. The method of claim 16,
    wherein the uplink transmission control message is transmitted when the communication device is in a predefined radio resource control state.

18. The method of claim 17,
    wherein the uplink transmission control message is transmitted when the communication device is in the radio resource control state CELL_FACH.

19. A communication device, comprising:
    a receiver circuit configured to receive a scheduling message, wherein the scheduling message comprises a receiving scheduling information specifying when to receive an uplink transmission control message, the receiving scheduling information being defined depending on a configuration of an uplink transmission channel; and
    a controller configured to control the communication device such that it is controlled in a receiving mode in accordance with the receiving scheduling information to receive an uplink transmission control message to control an uplink transmission from the communication device via the uplink transmission channel.

20. The communication device of claim 19, further comprising:
    a transmitter configured to provide uplink transmission to another communication device via the uplink transmission channel.

21. The communication device of claim 19,
    being configured as a radio terminal communication device.

22. The communication device of claim 19, wherein the uplink transmission channel is a shared channel.

23. The communication device of claim 19,
wherein the receiving scheduling information is defined depending on a selected configuration of an uplink transmission channel out of a plurality of configurations of an uplink transmission channel; and
wherein the controller is configured to control the communication device such that it is controlled in a receiving mode in accordance with the receiving scheduling information in accordance with the selected one configuration of an uplink transmission channel.

24. A method for receiving an uplink transmission control message in a communication device, the method comprising:
receiving a scheduling message, wherein the scheduling message comprises a receiving scheduling information specifying when to receive an uplink transmission control message, the receiving scheduling information being defined depending on a configuration of an uplink transmission channel;
controlling the communication device such that it is controlled in a receiving mode in accordance with the receiving scheduling information to receive an uplink transmission control message to control an uplink transmission from the communication device via the uplink transmission channel.

25. A communication device, comprising:
a scheduling message generating circuit configured to generate a scheduling message such that the scheduling message comprises a receiving scheduling information specifying when to receive an uplink transmission control message, the receiving scheduling information being defined depending on a configuration of an uplink transmission channel;
an uplink transmission control message generating circuit configured to generate an uplink transmission control message to control an uplink transmission from another communication device via the uplink transmission channel; and
a transmitter circuit configured to transmit via an uplink transmission control downlink channel:
a contention resolution information or an uplink transmission control message during a first predefined time period; and
only an uplink transmission control message during a second predefined time period, the second predefined time period being different from the first predefined time period.

* * * * *